United States Patent [19]

Baumeler

[11] Patent Number: 4,616,477
[45] Date of Patent: Oct. 14, 1986

[54] PNEUMATIC SERVOMOTOR

[75] Inventor: Markus Baumeler, Winterthur, Switzerland

[73] Assignee: Sulzer Brothers Limited, Winterthur, Switzerland

[21] Appl. No.: 751,190

[22] Filed: Jul. 2, 1985

Related U.S. Application Data

[62] Division of Ser. No. 474,285, Mar. 11, 1983, Pat. No. 4,566,273.

[30] Foreign Application Priority Data

Mar. 17, 1982 [CH] Switzerland ............................ 1665

[51] Int. Cl.[4] .......................................... F15B 11/06
[52] U.S. Cl. .................................. 60/415; 60/407; 92/143; 251/48
[58] Field of Search .................. 251/48; 91/418, 443, 91/454; 92/143, 60.5; 60/407, 412, 413, 415

[56] References Cited

U.S. PATENT DOCUMENTS

| 751,250 | 2/1904 | Blessing | 92/143 |
|---|---|---|---|
| 2,543,566 | 2/1951 | Brown | 251/48 |
| 2,861,144 | 11/1958 | Favre | 91/443 |
| 3,672,628 | 6/1972 | Aanstad | 92/143 |
| 4,018,050 | 4/1977 | Murphy | 60/412 |
| 4,103,863 | 8/1978 | Houlgrave et al. | 251/48 |
| 4,475,710 | 10/1984 | Leupers | 91/461 X |

Primary Examiner—Edward K. Look
Attorney, Agent, or Firm—Kenyon & Kenyon

[57] ABSTRACT

The servomotor is constructed with a cylinder and a surrounding pressure tank with a construction formed of a plurality of radial grooves through which air can be throttled during an emergency closing of a valve. The constriction is formed with a flow resistance equivalent to a free cross-sectional area of not more than $0.02D^2$; D being the inside diameter of the cylinder. The spherical pressure tank may be secured about a cup-shaped cylinder to form the pressurized chamber while radial grooves in a flange of the cylinder form a constriction with a cover secured to the cylinder and spherical tank.

7 Claims, 3 Drawing Figures

PNEUMATIC SERVOMOTOR

This is a division of application Ser. No. 474,285 filed Mar. 11, 1983 now Pat. No. 4,566,273.

This invention relates to a pneumatic servomotor. More particularly, this invention relates to a pneumatic servomotor for a valve. Still more particularly, this invention relates to a pneumatic servomotor for a steam isolating valve.

Heretofore, various types of pneumatic servomotors have been known, for example for use as an auxiliary drive for a steam isolating valve. In some cases, the servomotor is constructed with a piston which is slidably disposed in a cylinder and connected to a piston rod which passes through at least one end of the cylinder for connection to a droppable load. In addition, one side of the cylinder has a clearance space larger than the adjacent volume which is swept by the piston. This clearance space is, in turn, connected to a pressure medium source via a control valve and to a pressure medium sink via a control valve. The other side of the cylinder is connected to a pressure medium sink via at least one fixed aperture. Still further, the clearance space is divided by a constriction into a smaller chamber adjacent the piston and a larger chamber remote from the piston.

The cylinder of the servomotor may be in the form of a bush which is open at the bottom and disposed in a hollow cylinder such that the bottom edge of the cylinder is separated from the bottom end face of the hollow cylinder by an annular gap. The clearance space thus extends around the bottom edge of the cylinder through the annular gap, which forms the constriction, into the annulus between the cylinder and the hollow cylinder. This annulus thus forms a relatively large chamber remote from the piston.

However, it has been found with the known construction that when the load is dropped due to a breakage at a predetermined breaking point in the region of the piston rod, the compressed air in the clearance space may accelerate the piston to a speed such that as the piston rebounds on an upper abuttment, the piston destroys the cylinder and the lantern by means of which the cylinder is secured unless these parts are dimensioned far beyond the dimensions necessary for their normal function. The load may be dropped in this way, for example, if the servomotor is disposed as an auxiliary drive on a system medium operated valve and the valve is controlled to close by the system medium and to open by means of the servomotor.

In order to avoid the "rebound" problem, it has been proposed to utilize the cylinder side remote from the clearance space in order to brake the piston by making the fixed aperture sufficiently small. Although this may avoid piston impact, a very high pressure builds up beneath the cylinder cover on the other cylinder side when the piston approaches the cylinder cover. This, in turn, necessitates expensive reinforcement of the cover. Furthermore, this high pressure also acts on the fixings, for example, the lantern and the bolts therein. Accordingly, these fixings may also have to be over-dimensioned.

Accordingly, it is an object of the invention to prevent damage to a cylinder and the cylinder fixings of a servomotor in the event of a breakage of a predetermined breaking point.

It is another object of the invention to provide a simple relatively inexpensive and operationally reliable servomotor for a system medium operated valve.

It is another object of the invention to provide a simple means of decelerating a piston of a servomotor during an emergency operation.

Briefly, the invention provides a servomotor which is comprised of a cylinder of given diameter, a piston which is slidably mounted in the cylinder to move between a raised position adjacent one end of the cylinder and a lowered position spaced from the opposite end of the cylinder to define a first chamber therewith and a piston rod which is secured to the piston and extends to a droppable load such as a valve outside the cylinder. In addition, the servomotor has a means to define a second chamber for selectively receiving a pressurized medium; which chamber has a volume larger than the volume of the first chamber. Both chambers together define a clearance space.

A control valve is also provided for controlling a flow of pressurized medium from a source to the clearance space while a second control valve is provided for controlling a flow of medium from the clearance space to a pressure medium sink. Likewise, an aperture communicates a chamber formed in the cylinder above the piston with a pressure medium sink.

In accordance with the invention, a constriction communicates the first chamber with the second chamber in order to throttle a flow of pressurized medium from one chamber into the other when the piston is being moved. This constriction is further sized to have a flow resistance equivalent to a free cross-sectional area ($F_{id}$) of not more than $0.02\ D^2$; D being the diameter of the cylinder. This cross-sectional area is measured with respect to the resistance to a given rate of flow of air passing through the constriction.

During operation, the rate of flow of air to the piston from the larger chamber remote from the piston is greatly reduced by the sufficiently small constriction so that a high pressure cannot build up behind the moving piston to accelerate the piston excessively.

In clarification, it is noted that the term "constriction" denotes a narrowing of the flow path from one chamber to another. This constriction is formed, for example, by one or more apertures which are connected in parallel or, in the style of a labyrinth, in series or by a portion of piping.

The important feature of the invention is that the constriction taken as a whole, e.g. as an area F of a single aperture, behaves, relative to the flow resistance $\Delta p$ of a given airflow through the aperture, in the same way as an ideal free cross-section $F_{id}$ over the entire area of which there is a parallel flow of the theoretically possible velocity $v = (2\Delta p/\rho)$; where $\rho$ denotes the air density on the admission side.

The effect of the servomotor can be considerably enhanced by reducing the size of the first chamber adjacent the piston. For example, the volume of this chamber may not be more than 10% of the volume of the total volume of the first and second chambers.

If the free cross-section of the control valves is substantially equal to or larger than that of the throttle aperture defined by the constriction, one of the control valves may be connected to the second chamber, which is remote from the piston. This gives the advantage that there is less stress on a predetermined breaking point in the event of a sudden opening of the control valve connected to the pressure medium source.

In one embodiment, the means defining the second chamber is in the form of a pressure tank which is disposed over and about the cylinder and a cover which is secured to the tank and cylinder. In addition, the constriction is formed by a plurality of radial grooves which are formed in the cylinder in facing relation to and adjacent the cover. Still further, the rod is provided with a bore which communicates an upper end of the piston with the exterior of the cover. This construction is particularly favorable with respect to the total weight of the servomotor.

These and other objects and advantages of the invention will become more apparent from the following detailed description taken in conjunction with the accompanying drawings wherein.

Figures 1, 2:
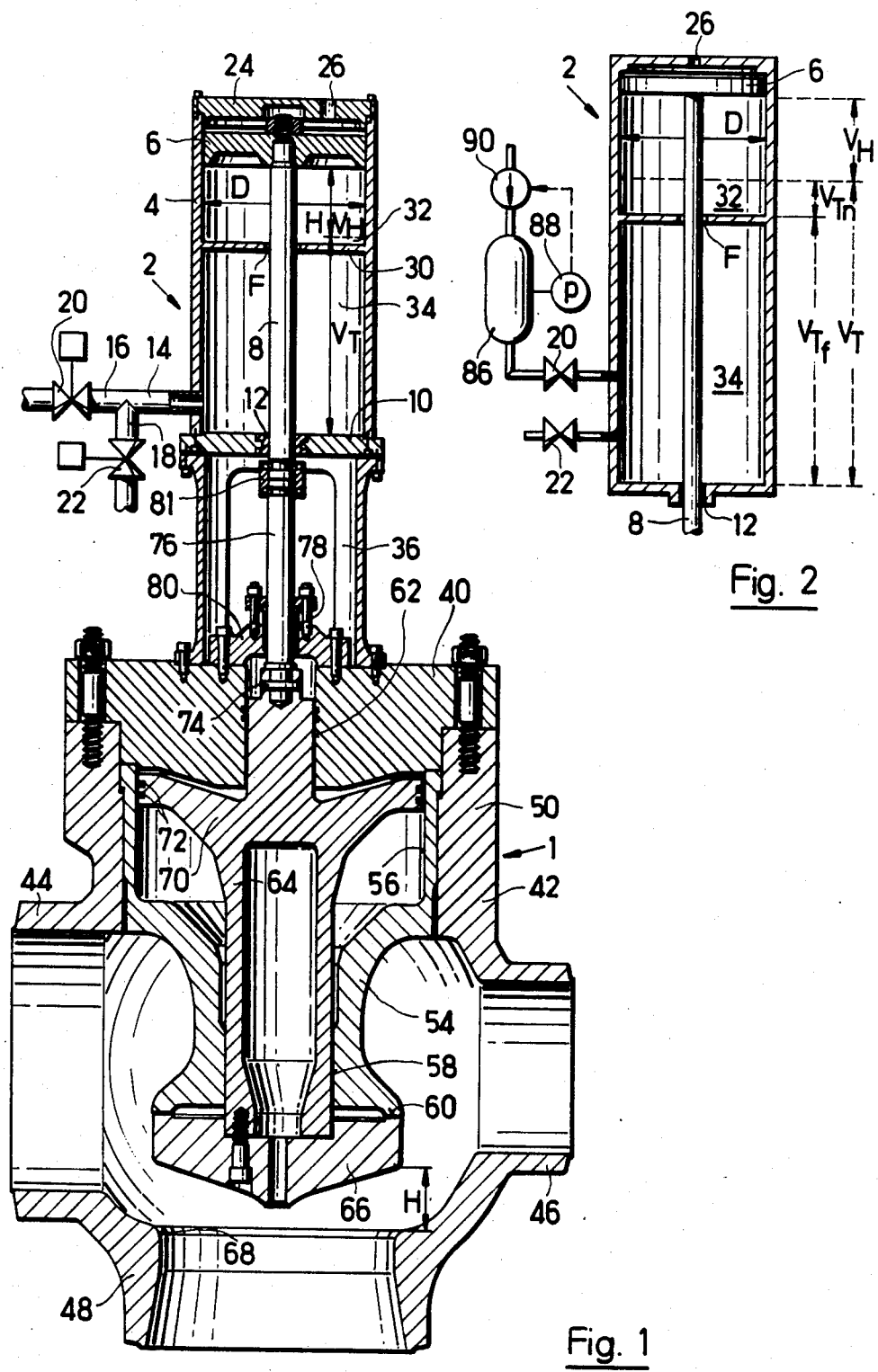
FIG. 1 illustrates a diagrammatic sectional view through a system medium operated valve having a pneumatic servo-motor constructed in accordance with the invention.
FIG. 2 illustrates a further diagrammatic view of the pneumatic servomotor of FIG. 1.

Referring to FIG. 1, a system medium operated steam isolating valve 1 is provided with a pneumatic servomotor 2 for purposes as described below.

The servomotor 2 includes a cylinder 4 of a given inside diameter D and a piston 6 which is slidably mounted in the cylinder to move between a raised position adjacent one end face of the cylinder 4, as indicated in FIG. 1, and a lowered position (not shown) over a stroke H. In addition, a piston rod 8 is secured to the piston 6 and extends through an end face 10 of the cylinder 4 via a seal 12.

Upon displacement through the stroke H, the surface of the piston 6 sweeps a swept volume $V_H$. This swept volume $V_H$ is followed by a clearance space of a volume $V_T$ (see FIG. 2). A means in the form of a partition 30 is provided in the cylinder 4 so as to define a first chamber 32 with the piston 6 when the piston is in the lowered position as well as a second chamber 34 of larger volume. The partition 30 also forms a constriction which communicates the two chambers 32, 34 with each other. As indicated, the partition 30 narrows the cross-section of the cylinder 4 to an annular surface F which surrounds the piston rod 8. This constriction serves to throttle a flow of pressurized medium from the larger chamber 34 into the smaller chamber 32, as described below. To this end, the annular surface F is sized so as not to exceed a specific cross-sectional area dependent upon the inside diameter D of the cylinder 4. That is, the constriction has a flow resistance equivalent to a free cross-sectional area $F_{id}$ of not more than $0.02\ D^2$ relative to a given flow of air passing therethrough.

As shown in FIG. 1, a spigot 14 is connected to the bottom zone of the cylinder 4 in communication with the larger chamber 34 and forks into two branch lines 16, 18 each of which contains a control valve, such as a solenoid valve 20, 22. One branch line 16 is connected to a suitable source of pressurized medium while the solenoid valve 20 therein serves to control the flow of pressurized medium to the chamber 34. The other branch line 18 is connected to a pressure medium sink while the solenoid valve 22 therein controls the flow of medium from the chamber 34 to the pressure medium sink. For example, the pressure medium sink may be an area of atmosphere pressure surrounding the servomotor 2.

The servomotor 2 also has a cover 24 secured over the the upper end of the cylinder 4 in suitable manner and in which an aperture 26 is provided as a means to communicate a chamber between the piston 6 and the cover 24 with a pressurized medium sink. In addition, the cylinder 4 is secured to a cover 40 of the flow-controlled valve 1 via a lantern 36.

The valve 1 includes a body 42 with an inlet 44, a passage spigot 46, an outlet port 48 and a cover spigot 50. In addition, an insert 54 having a cylindrical friction surface 56, a cylindrical guide surface 58 and a back seat surface 60, is bolted to the cover 40 in the cover spigot 50. In addition, the cover 40 is formed with an axial bore 62 in which a valve spindle 64 is slidably mounted. The spindle 64 is also slidably mounted in the cylindrical guide surface 58 of the insert 54.

The valve spindle 64 carries a valve plate 66, and which cooperates with a seat surface 68 on the exhaust port 48. As indicated, a piston 70 is formed on the valve spindle 64 and is in seal tight contact with the cylindrical friction surface 56 via piston rings 72. In addition, an intermediate rod 76 is secured to the end of the valve spindle 64 which is mounted in the cover 40 via a shear pin 74 which forms a predetermined breaking point.

The intermediate rod 76 is sealed by a stuffing box 78 where the rod 76 passes through a cover 80 bridging the bore 62 in the valve cover 40. As indicated, the rod 76 is coupled to the piston rod 8 of the servomotor 2 via a valve coupling 81 formed of two halves with a collar on each side.

The flow-controlled valve 1 is provided with connecting ducts (not shown) and control valves of the kind described, for example in European patent application 81 100 602.2.

With respect to the operation of the flow-controlled valve 1 and the servomotor 2, it is assumed that the flow to the valve 1 extends from the inlet 44 to the exhaust port 48. If the valve 1 is moved in closed position for normal operation, the cylinder chamber beneath the piston 70 is relieved via ducts (not shown). There is also a flow of system medium through ducts (not shown) out of the area of the inlet 44 and into the cylinder chamber above the piston 70. Thus, the valve spindle 64, valve plate 66 and piston 70 descend as a movable unit until the valve plate 66 bears in seal-tight relationship on the seat surface 68.

During this time, the solenoid valve 22 is open while the piston 6 of the servomotor 2 moves downwardly through the stroke H.

In the event that the valve 1 has been closed, and the system medium is devoid of pressure, the pneumatic servomotor 2 is used to open the valve 1.

When the servomotor 2 is actuated, the solenoid valve 20 which controls the connection to the pressure medium source (not shown) is opened and the solenoid valve 22 is closed, so that air, for example at a pressure of six bars, flows into the cylinder chamber 34 below the piston 6. This pressure causes the entire moving system of piston 6, piston rod 8, connecting rod 76, valve spindle 64, piston 70 and valve plate 66 to be raised and the valve 1 thus opened. If the medium flowing through the valve 1 is now pressurized and then the cylinder chamber beneath the piston 70 is relieved, for example by a safety mechanism (not shown), the valve 1 moves into the closing position in which the piston 6 of the servomotor 2 is pulled into the bottom stroke end position.

For the case that the solenoid valves 20, 22 unintentionally remain closed, the clearance space $V_T$ is of a dimension such that a pressure of twelve bars cannot be exceeded in order to insure that no excessive pressure forms as a result of the compression of the air beneath the piston 6. Since breakage of the shear pin 74 cannot be reliably prevented during this operation, there is a risk that the potential energy of the compressed air stored in the clearance space $V_T$ would drive the piston 6 upwards against the cylinder cover 24. Under such conditions, the piston 6 might assume a high speed with the kinetic energy stored in the moving piston mass resulting in destruction of the cover 24 and possibly other parts of the servomotor 2 and/or the lantern 36. However, because the constriction is formed with a narrow throttle aperture to provide adequate throttling of the flow of air from the chamber 34 into the chamber 32, the piston 6 is prevented from moving upwardly at a high speed.

Referring to FIG. 2, wherein like reference characters indicate like parts as above, the partition 30 is shown as dividing the clearance space $V_T$ into two chambers 32, 34 of respective volumes $V_{Tn}$, $V_{Tf}$. The constriction defined by partition surface F comes into full effect only when the chamber 32 adjacent the piston 6 forms a small proportion of the total clearance space $V_T$. Advantageously, the volume $V_{Tn}$ of the chamber 32 is not more than 10% of the volume $V_T$ of the clearance space, i.e. the total volume of the chambers 32, 34. Of note, the volume $V_H$ which is swept by the piston 6 is less than the clearance volume $V_T$.

As indicated in FIG. 2, the valve 20 may control a flow of pressurized medium from a pressure medium container 86 which is charged up via a pump 90. As indicated, the pump 90 is controlled by a pressure pick-off 88 and draws air from the atmosphere. The solenoid valve 22 controls a flow in a branch line which leads directly to atmosphere.

As also indicated, the aperture 26 in the cylinder cover 24 is so dimensioned that the maximum portion of the energy transmitted to the piston 6 by the compressed air in the chambers 32, 34 is absorbed in the chamber defined between the piston 6 and the cover 24 without the pressure in that chamber rising appreciably above a design pressure of about fifteen bars which is selected for other reasons. The construction of the servomotor of FIG. 3 enables the overall mass of the servomotor which is fitted onto a flow-control valve 1 to be kept low.

Figure 3:
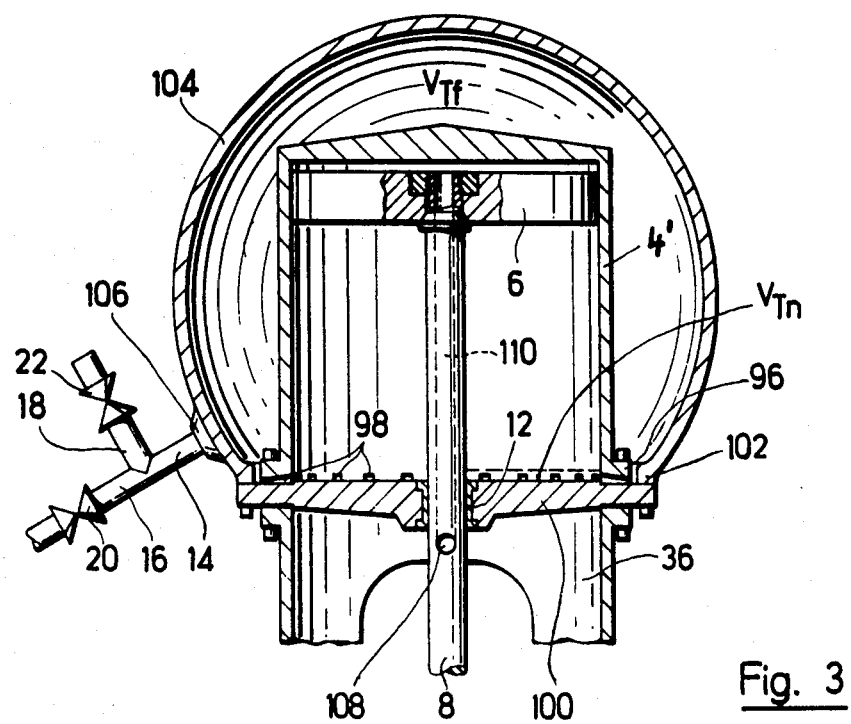
FIG. 3 illustrates a still further modified servomotor constructed in accordance with the invention.

Referring to FIG. 3, wherein like reference characters indicate like parts as above, the means defining a second chamber includes a spherical pressure tank 104 which is bolted in seal tight relationship on a cover 100 about a cylinder 4'. In this case, the cylinder 4' is closed at the upper end, as viewed, in the form of a pot and has a flange 96 at the lower end which is bolted to the flat cover 100. In addition, the flange 96 is provided with a plurality of radial grooves 98 which are disposed in facing relation to and adjacent the cover 100 in order to form a constriction.

The servomotor also has a piston rod 8 which is secured to the piston 6 and which passes through a central sliding seal 12 in the cover 100. This piston rod 8 also has a longitudinal bore 110 which communicates an upper end face of the piston 6 with the exterior of the cover 100 via a transverse bore 108. The bores 108, 110 perform the function of the aperture 26 illustrated in FIGS. 1 and 2 i.e., to communicate the interior of the cylinder with a pressure medium sink.

As shown, the spherical pressure tank 104 rests on the cover 100 via an annular flange 102 which is radially spaced outside the flange 96 of the cylinder 4'. Further, a spigot 14 is disposed on a bore 106 of the tank 104 to communicate with the interior of the tank 104. As above, the spigot 14 has two branches 16, 18 in which control valves 20, 22 are disposed to control flow therethrough.

In this arrangement, a constriction is formed by the radial grooves 98 and the adjacent annular gap between the flanges 96 and 102. The free cross-sectional area F of this constriction can be readily adjusted by selecting different dimensions for the grooves 98. As such, the servomotor of this embodiment is of particularly simple construction.

Further, the pressure tank 104 can be of lightweight construction such that the center of gravity of the servomotor is near the flow-control valve (not shown) which is of particular advantage for earthquake safety.

The invention thus provides a servomotor which is capable of reacting to a breakage of a predetermined breaking point without damaging the cylinder and/or lantern fixings.

Further, the invention provides the servomotor which can be made of relatively simple and compact construction.

In the above text, the terms "above", "below", "down", "up" and similar, refer exclusively to the enclosed Figures and are not characteristic to the invention.

What is claimed is:

1. A pneumatic servomotor comprising
   a cover;
   a cup-shaped cylinder secured to said cover at an open end thereof, said cylinder having a predetermined inside diameter and a plurality of radial grooves at said open end defining apertures having a flow resistance to a given rate of flow or air passing therethrough equivalent to a free cross-sectional area not more than 0.02 times the square of said inside diameter;
   a piston slidably mounted in said cylinder to move between a lowered position spaced from said open end to define a first chamber between said cover and said piston and a raised position adjacent a closed end of said cylinder;
   a piston rod secured to said piston and passing through said cover, said rod having a bore communicating an upper end face of said piston with the exterior of said cover;
   a part-spherical pressure tank secured to said cover about said cylinder to define a second chamber therewith, said chamber being in communication with said first chamber through said radial grooves in said cylinder;
   means including a first control valve for controlling a flow of pressurized medium from a source into said second chamber; and
   means including a second control valve for controlling a flow of medium from said second chamber to a pressure medium sink.

2. A pneumatic servomotor for a valve comprising
   a cylinder having an inside diameter (D);
   a piston slidably mounted in said cylinder to move between a raised position adjacent one end face of said cylinder and a lowered position spaced from the opposite end face of said cylinder to define a first chamber therewith;

a piston rod secured to said piston and extending through said first chamber and said opposite end face for connection to a load outside said cylinder;

means defining a second chamber about said cylinder for selectively receiving a pressurized medium, said second chamber having a volume larger than the volume of said first chamber;

a constriction communicating said first chamber with said second chamber to throttle a flow of pressurized medium therethrough, said constriction having a flow cross-sectional area ($F_{id}$) of not more than $F_{id}=0.02\ D^2$;

a first control valve for controlling a flow of pressurized medium to said second chamber;

a second control valve for controlling a flow of medium from said second chamber; and a means communicating a chamber between said piston and said one end of said cylinder with a pressure medium sink.

3. A pneumatic servomotor as set forth in claim 2 wherein said means defining said second chamber includes a pressure tank over and about said cylinder and a cover secured to said tank and said cylinder and wherein said constriction includes a plurality of radial grooves in said cylinder in facing relation to and adjacent said cover.

4. An pneumatic servomotor for a valve comprising
a cylinder having an inside diameter (D) and a pair of end faces;

a piston slidably mounted in said cylinder to move between a first position adjacent one end face of said cylinder and a second position spaced from said one end face to define a first chamber therewith;

a piston rod secured to said piston and extending through the other end face of said cylinder for connection to a valve outside said cylinder;

means about said cylinder to define a second chamber with said cylinder, said second chamber having a volume larger than the volume of said first chamber;

a first control valve for controlling a flow of pressurized medium to said second chamber;

a second control valve for controlling a flow of medium from said second chamber;

a constriction communicating said first chamber with said second chamber to throttle a flow of pressurized medium from said second chamber into said first chamber, said constriction having a flow cross-sectional area ($F_{id}$) of not more than ($F_{id}=0.02\ D^2$); and an aperture communicating a third chamber between said piston and said one end face of said cylinder with a pressure medium sink.

5. A pneumatic servomotor as set forth in claim 4 which further comprises a pressure tank connected with said first control valve to supply pressurized medium thereto.

6. A servomotor as set forth in claim 4 wherein said piston defines a sub-chamber in said second position and wherein said piston has a stroke which displaces a volume less than the combined volumes of said second chamber and said sub-chamber.

7. A servomotor as set forth in claim 6 wherein said sub-chamber has a volume not more than 10% of the total volume of said second chamber and said sub-chamber.

* * * * *

UNITED STATES PATENT AND TRADEMARK OFFICE
CERTIFICATE OF CORRECTION

PATENT NO. : 4,616,477

DATED : October 14, 1986

INVENTOR(S) : MARKUS BAUMELER

It is certified that error appears in the above-identified patent and that said Letters Patent is hereby corrected as shown below:

Column 2, line 54 "v= (2∆p/p);" should be -- $v=\sqrt{\frac{2\Delta p}{p}}$ --

Column 7, line 31 "An" should be -A-

Signed and Sealed this

Twenty-first Day of April, 1987

Attest:

Attesting Officer

DONALD J. QUIGG

Commissioner of Patents and Trademarks